Jan. 28, 1969  K. RITTER  3,424,032
DRIVE PARTICULARLY FOR GARDEN TRACTORS OR LIKE VEHICLES
Filed Oct. 20, 1966  Sheet 1 of 3
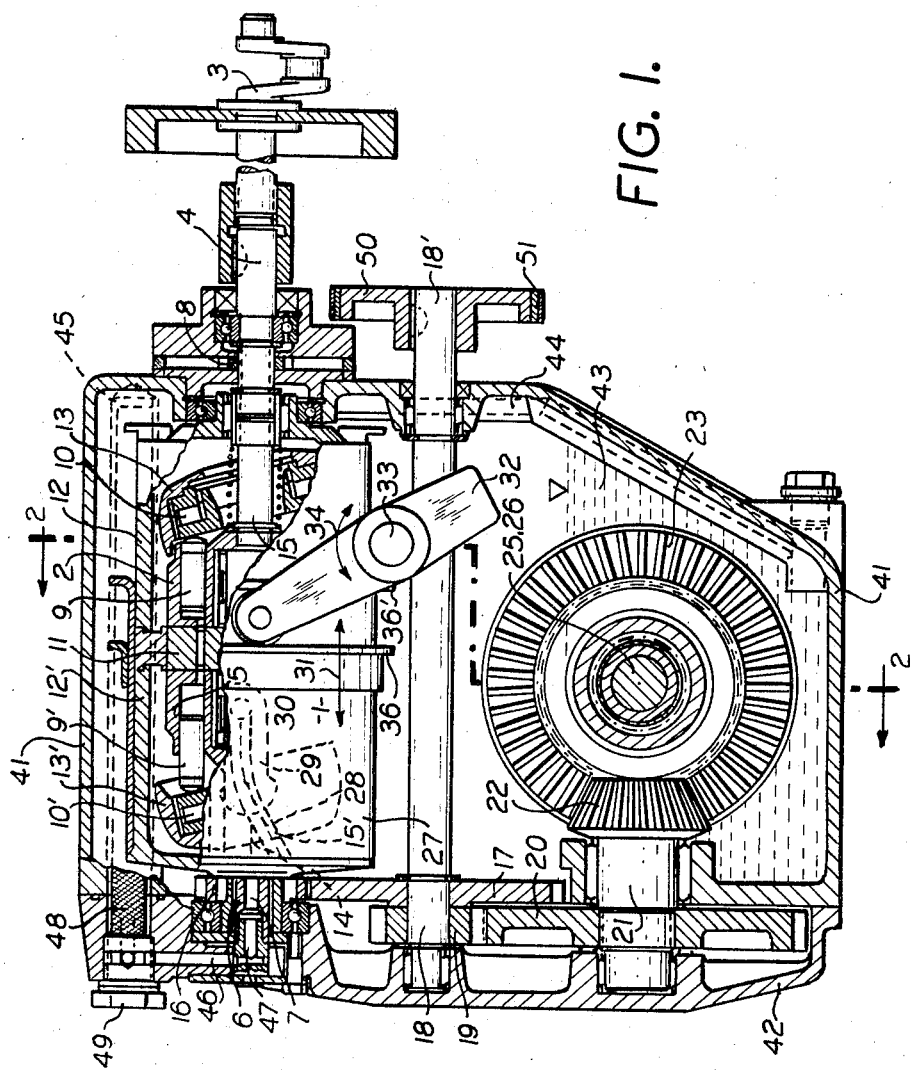
FIG. I.
INVENTOR
KASPAR RITTER
BY
ATTORNEY.

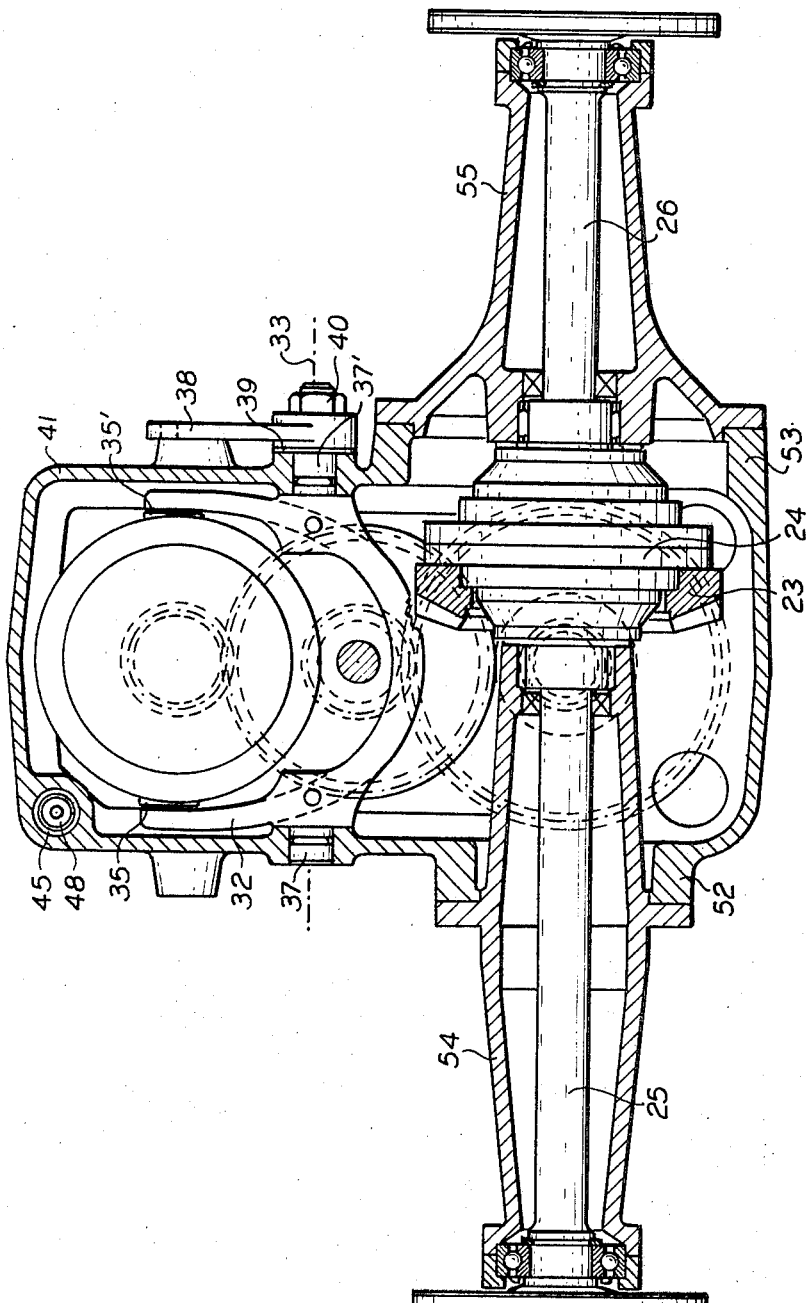

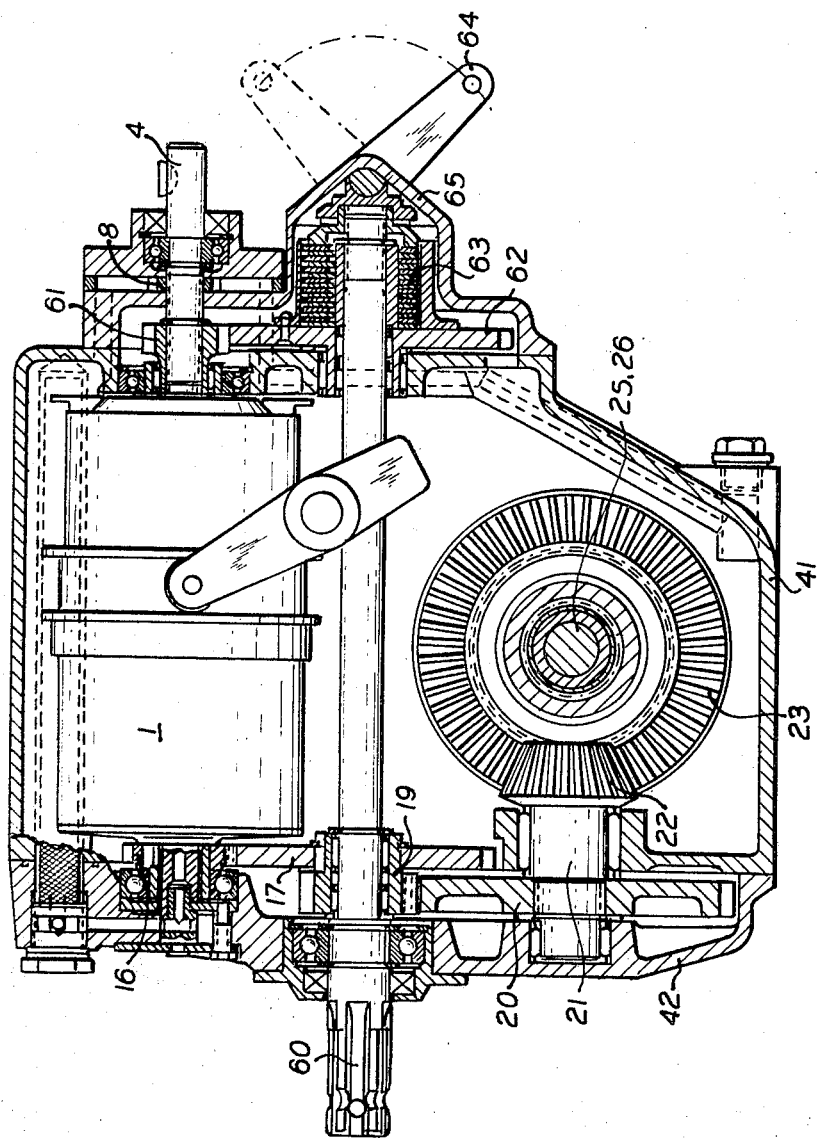

United States Patent Office 3,424,032
Patented Jan. 28, 1969

3,424,032
DRIVE PARTICULARLY FOR GARDEN TRACTORS OR LIKE VEHICLES
Kaspar Ritter, Kirchheim, Teck, Germany, assignor to Kopat Gesellschaft fur Konstruktion, Entwicklung und Patentverwertung m.b.H. & Co. K.G., Boll, Kreis Goppingen, Germany, a corporation of Germany
Filed Oct. 20, 1966, Ser. No. 588,068
Claims priority, application Germany, Jan. 18, 1966, K 58,168
U.S. Cl. 74—730                8 Claims
Int. Cl. F16h 47/06

ABSTRACT OF THE DISCLOSURE

A drive, particularly for garden tractors having a low motor-output and travelling speed comprising a housing, a hydraulic torque converter having an output side and an endless controllable hydrostatic drive having a pump part and a motor part, each of the parts incorporating a swinging body, and a driving motor including an input shaft operatively connected with the pump part. A multi-step mechanical reduction gear is disposed between the output side and a driven shaft. Control means for varying the transmission ratio include a sliding sleeve with control grooves for the swinging bodies. A fork member cooperates to adjust the sliding sleeve and is pivotally mounted in the housing. The housing encloses the hydrostatic drive and at least the first steps of the mechanical reduction gear and constitutes an oil storage container. A filling pump forms part of the input shaft accessible from the outside of the drive; conduits connect the sump with the filling pump and to the torque converter, the channels being formed in the housing; and an oil filter is disposed in the channels between the filling pump and the torque converter and easily accessible from the outside.

---

The present invention relates to a drive, particularly for garden tractors or the like vehicles in general and to such vehicles with comparatively small motor-output and/or travelling speed.

In such vehicles mostly multi-step transmission drives with a friction clutch disposed between the driving motor and the drive are used. However, hydrostatic drives are also known for this purpose consisting of a pump part and a motor part, which hydrostatic drives permit an endless variation of the transmission ratio under load, and, therefore, do not require a clutch for disconnecting the travelling drive.

It is one object of the present invention to provide a drive, in particular for garden tractors and the like vehicles, wherein a drive of the last-mentioned type is provided which, due to a particularly simple total structure combines an economical manufacturing possibility with an easy maintenance, a good output and the least outer measurements.

It is another object of the present invention to provide a drive, in particular for garden tractors and the like vehicles, which provides the cooperation of the following individual features:

(a) A hydraulic torque converter is designed as endlessly variable hydrostatic drive consisting of a pump portion and a motor portion, the pump portion of the drive being connectable with the drive motor.

(b) A multi-step mechanical reduction drive is disposed between the output side of the hydraulic torque converter and the axle drive.

(c) The control device for varying the transmission ratio in the hydrostatic drive comprises a rotating sliding sleeve equipped with control grooves for the swinging bodies of the pump portion and the motor portion, which sliding sleeve is adjustable by means of a fork member swingable about a cross axis.

(d) The hydrostatic drive and at least the first steps of the mechanical reduction drive, as well as the control device are surrounded by a common drive housing formed simultaneously as an oil storage container.

Such drive permits variation of the travelling speed of the vehicle equipped therewith between fully forward over standstill to fully rearward without steps by means of a simple proper operation of a speed selecting lever, whereby the driving motor always remains connected with the drive wheels by means of a pressure lock and a clutch can be eliminated for this reason. By the direct connection of the pump portion of the hydrostatic drive with the driving motor and the arrangement of a multi-step, preferably at least three-step, mechanical reduction gear with a rigid reduction ratio between the hydrostatic drive and the axle drive, the dimensions of the hydrostatic drive can be maintained as to its diameter and to its length so small, that the hydrostatic drive together with the mechanical reduction gear can be well disposed in a joint housing serving simultaneously as oil storage container. Due to the small dimensions of the hydrostatic drive with a pump portion driven directly by the motor only comparatively small forces up to 50 kg. are required for the variation of the transmission ratio by axial displacement of a slide sleeve equipped with corresponding control grooves and determining the position of the swinging body. These forces can be obtained by means of a fork member swingable about a cross axis of the drive by a sufficiently long lever without difficulty manually or by means of a comparatively small servo adjustment device.

It is still a further object of the present invention to provide a drive, particularly for garden tractors and the like vehicles, wherein the drive includes an arrangement according to which a filling pump forming simultaneously a portion of the input shaft is easily accessible from the outer side of the drive. In this manner the quantity of working fluid required for the compensation of leak losses can be fed by saving of all additional driving elements particularly poor on losses by maintenance of a certain pressure above atmospheric pressure continuously in the inner pressure fluid cycle of the drive.

It is yet another object of the present invention to provide a drive, particularly for garden tractors and the like vehicles, wherein the conduits serving the feeding of oil from the sump to the filling pump and from the filling pump to the hydraulic torque converter are designed as housing channels. By such arrangement all particular oil conduits can be saved, which amounts to an appreciable mounting simplification, increasing the operational safety and contributing to the reduction of the manufacturing costs.

Advantageously the housing channels are simultaneously designed such, that an oil filter easily accessible from the outer side of the drive is disposed in the pressure oil channel from the filling pump to the hydraulic torque converter. Such inclusion also of the oil filter into the drive housing brings about the elimination of a particular housing and of the outer connecting conduits with the filter, a further saving of parts and contributes simultaneously to the increase of operational safety by the elimination of comparatively easily damageable parts disposed outside of the drive housing.

It is still a further object of the present invention to provide a drive, particularly for garden tractors and the like vehicles, wherein the drive is designed such, that the driving elements, as toothed gears and a clutch for a power take-off shaft, which is independent from the travel, are likewise disposed inside of the housing. By the additional equipment of the drive according to the present invention with such power take-off shaft of the motor, which shaft is entirely independent from the travelling operation and which can be switched on and off under load, the range of application of the drive can be extended also to such vehicles, wherein the connection with devices driven by the power take-off shaft, for instance mowing machines, saw cutters, snow removers or the like, is provided.

It is yet a still further object of the present invention to provide a drive, particularly for garden tractors and the like vehicles, wherein an embodiment of the drive designed in accordance with the present invention, advantageous for the production of the housing, as well as for the assembly and finally also concerning overhauling the unit, in equal manner comprises the feature, that the first two steps of the at least three-step reduction gear for the travelling drive are designed as pairs of spur gears and are disposed easily accessible at one end of the drive housing by means of a single cover.

In order to eliminate the insertion of shaft wheel brakes for the use of drives according to the present invention provided in garden tractors or the like vehicles, it is likewise within the framework of the present invention that the two median spur gears of the reduction gear drive are connected with a shaft projecting from the housing and serving the reception of a brake.

It is finally a further object of the present invention to provide a drive, particularly for garden tractors or the like vehicles, wherein the drive housing has connecting elements, for instance flanges, screws or the like, adapted for an axle member serving as support for the wheel driving shafts. By such organic connection of the wheel drive, designed in accordance with the present invention, with the drive wheels and/or the driving motor, it is possible to provide, in advantageous manner, a complete driving block, which contributes especially to a particularly simple and economical structure of the entire vehicle.

With these and other objects in view, which will become apparent in the following detailed description, the present invention will be clearly understood in connection with the accompanying drawings in which:

FIGURE 1 is an axial section of the drive designed in accordance with the present invention;

FIG. 2 is a section along the lines 2—2 of FIG. 1; and

FIG. 3 is an axial section of the drive disclosing another embodiment of the drive with the output shaft of the motor.

Referring now to the drawings, and in particular to FIGS. 1 and 2, the drive comprises as its main elements an endlessly controllable hydrostatic drive 1, the pump piston drum 2 of which is connected for joint rotation with a drive motor 3 by means of a shaft 4, which can be made of several parts. A piston drum 5 of the hydrostatic drive 1 is supported on the drive housing 41 and 42, by means of an immovable holding shaft 6, through the bore 7 of which, by means more clearly described below, working fluid is fed continuously from a filling pump 8 at a predetermined pressure above atmospheric pressure into the inner cycle of the hydrostatic drive 1. This follow-up of working fluid is required, in order to replace the quantity of liquid escaping by unavoidable leak losses and simultaneously to maintain the pistons 9 and 9', respectively, and the piston drums 2 and 5, respectively, continuously in pressure force engagement at the corresponding axial pressure bearings 10 and 10', respectively. From the hydrostatic drive 1, operating in accordance with the principle of the so-called "inner power distribution," the output power is taken from the rotating housing 12 and 12', respectively, which is connected against rotation with a control disc 11, in which housing 12 and 12' swinging bodies 13 and 13' are swingably mounted about two axles 15 and 15', respectively, disposed crosswise to the longitudinal axis 14 of the hydrostatic drive 1, for the variation of the transmission ratio. A driven pinion 16 is connected for joint rotation with the rotating housing 12 and 12', which driven pinion 16 forms with a spur gear 17 the first step of the totally three-step mechanical reduction gear arranged behind the hydrostatic drive 1.

The second step of the mechanical reduction gear comprises a pinion 19, connected for joint rotation with the spur gear 17 by means of an intermediate shaft 18, and a spur gear 20. The latter is secured for joint rotation to a shaft 21 of a beveled gear drive consisting of a pinion 22 and a crown gear 23. The crown gear 23 is rigidly connected with a housing 24 shown in elevation of a conventional differential drive, as can be determined from FIG. 2, over which the two wheel drive shafts 25 and 26 are driven.

The control device for variation of the transmission ratio in the hydrostatic drive 1 comprises a slide sleeve 27 guided for longitudinal movement, but non-rotatably on the rotating housing 12 and 12', respectively, which sliding sleeve 27 has at its inside control grooves 28. Ball-shaped catch members, for instance, secured to arms of the swinging bodies 13 and 13' engage the control grooves 28 such, that the swinging bodies 13 and 13', respectively, upon adjustment of the sliding sleeve 27 in one or the other direction of the double arrow 31 swing about the axis 15 and 15', respectively, and, thereby, the transmission ratio in the hydrostatic drive 1 can be endlessly varied between fully forward over standstill to fully rearward. During the movement of the slide sleeve 27, a fork member 32 in the drive-housing 41 is swingably mounted about a cross axle 33 in the direction of the double arrow 34. This fork member 32 has at each of its ends a roller 35 and 35', respectively, which engage with little play between the flanges 36 and 36', respectively, of the slide sleeve 27. An operating lever 38 is secured on bearing pins 37 and 37', respectively, projecting from the drive housing 41 and connected for joint rotation with the fork member 32, for instance by means of a notched toothing, however, adjustable as to its angle. By insertion of a friction disc 39 between the operating lever 38 and the housing 41 a desired damping degree for the drive adjustment is simultaneously obtained by means of a holding nut 40. The entire above described hydrostatic drive 1 with its adjusting device and the three-step mechanical reduction gear disposed behind the adjusting device are surrounded by the housing 41 which is equipped with a removable cover 42, which is formed at its lower portion simultaneously as container for the oil storage for operation of the hydrostatic drive 1.

The filling pump 8, referred to above, and disposed on the input shaft 4 of the hydrostatic drive 1 sucks oil continuously during rotating of the drive shaft through a suction conduit 44 provided as a housing channel and feeds the oil with a comparatively low pressure above atmospheric pressure of about 3 to 5 atmospheres through the pressure conduits 45 and 46, likewise designed as housing channels and an oil feed 47, as well as the bore 7 in the holding shaft 6 to the inner cycle of the drive 1. An oil filter 48 is inserted into the housing channel 45 by means of a hexagon-headed screw bolt 49 on the outside.

In the embodiment disclosed in FIGS. 1 and 2, the intermediate shaft 18 of the mechanical reduction gear includes a shaft end 18', which is adapted for the application of a brake 50 and 51 of any conventional structure, and extends from the housing 41. The driving housing 41 has additionally connection flanges 52 and 53 for the connection of axle cones 54 and 55, respectively, whereby the drive, designed in accordance with the present invention, can be complemented to a complete driving unit, in which under circumstances the driving motor can be included by means of a corresponding flange connection.

Referring now again to the drawings and in particular to FIG. 3, the embodiment disclosed therein is distinguished over the embodiment disclosed in FIGS. 1 and 2 substantially by the arrangement of a power take-off shaft 60. This power take-off shaft 60 is in operative connection with the input shaft 4 of the hydrostatic drive 1 by means of a pair of gears 61 and 62 and a multiple-disc clutch 63 having an operating lever 64 such, that the power output shaft 60 is driven completely independently from the travelling drive to the wheel drive shafts 25 and 26 over the hydrostatic drive 1 and the following mechanical reduction gears 16, 17, 19, 20, 22 and 23 proportionately to the number of revolutions of the motor and upon operating of the clutch 63 at any time and can be put in and out of operation also under load. The entire power output shaft drive 61, 62 and 63 is covered up by a cover 65 provided at the front side of the drive housing 41 and thus arranged easily accessible in spite of a completely oil- and dust-tight sealing upon removal of the cover 65. Upon removal of the cover 42 on the back side of the housing 41, also the entire mechanical reduction gear drive for the travelling drive disposed within or tightly arranged below the cover 42 is easily accessible in both shown embodiments of the drive designed in accordance with the present invention for mounting and overhauling. The median pair of gears 17 and 19 of the spur gear drive is freely rotatably mounted on the power output shaft 60 in the embodiment disclosed in FIG. 3. By arrangement of the clutch connection possibility between the pair of gears 17 and 19 and of the power output shaft 60, the latter can be driven selectively also as travel output shaft, whereby the clutch 63 must be of course released.

While I have disclosed several embodiments of the present invention, it is to be understood that these embodiments are given by example only and not in a limiting sense, the scope of the present invention being determined by the objects and the claims.

I claim:
1. A drive, particularly for garden tractors or similar vehicles having a low motor-output and travelling speed, respectively, comprising
   a housing,
   a hydraulic torque converter having an output side and including an endless controllable hydrostatic drive having a pump part and a motor part,
   each of said parts incorporating a swinging body,
   a driving motor including an input shaft and operatively connectable with said pump part,
   a driven shaft,
   a multi-step mechanical reduction gear disposed between the output side of said hydraulic torque converter and said driven shaft,
   control means for variation of the transmission ratio in said hydrostatic drive comprising a sliding sleeve having control grooves for said swinging bodies of said pump part and of said motor part, respectively,
   a fork member swingable in said housing about a crosswise disposed axis and adjusting said sliding sleeve duirng the swinging movement of said fork member,
   said housing enclosing said hydrostatic drive and at least the first steps of said mechanical reduction gear, as well as said control means, said housing constituting simultaneously an oil storage container,
   a filling pump forming a part of said input shaft and easily accessible from the outside of said drive,
   a sump,
   conduits connecting said sump with said filling pump and said filling pump with said torque converter,
   said conduits being formed as channels in said housing,
   an oil filter disposed in said channel between said filling pump and torque converter, and
   said oil filter is easily accessible from the outside of said drive.

2. The drive, as set forth in claim 1, which includes
   a power output shaft operable independently from the travel of said vehicle,
   driving means and a clutch for operation of said power output shaft, and
   said driving means and said clutch are likewise disposed within said housing.

3. The drive, as set forth in claim 1, wherein
   said multi-step mechanical reduction gear has at least three steps,
   the first two steps of said reduction gear for a travelling drive are spur gears and disposed at one end of said housing, and
   a single cover closing said one end of said housing and permitting easy access to said spur gears.

4. The drive, as set forth in claim 1, wherein
   said multi-step reduction gear includes two spur gears in its median step, and
   a shaft projecting from said housing and operatively connected to and rotating with said spur gears, said shaft being adapted to receive a brake thereon.

5. The drive, as set forth in claim 1, which includes
   flange formations formed by said housing and adapted to receive accessory elements operatively connected with said drive.

6. The drive, as set forth in claim 5, wherein
   said accessory elements comprises axle covers through which shafts for the driving wheels extend.

7. The drive, as set forth in claim 5, wherein
   said accessory elements comprises a driving motor.

8. The drive, as set forth in claim 1, wherein
   said at least first steps of said mechanical reduction gear are substantially located at least in part directly under said hydrostatic torque converter, and said housing adjacent said at least first steps of said reduction gear constituting said oil storage container beneath said hydrostatic torque converter, said housing constituting a compact unit of minimum dimensions.

References Cited

UNITED STATES PATENTS

| | | | |
|---|---|---|---|
| 2,296,929 | 9/1942 | Ifield | 74—687 X |
| 2,671,359 | 3/1954 | Scheiter | 74—730 |
| 2,749,766 | 6/1956 | Blair | 74—730 X |
| 2,926,551 | 3/1960 | Howard | 74—732 X |
| 2,968,379 | 1/1961 | Kelley | 74—732 X |
| 2,985,036 | 5/1961 | Forster | 74—730 X |
| 3,037,572 | 6/1962 | Ritter | 74—15.8 X |
| 3,053,115 | 9/1962 | Cartwright et al. | 74—730 |
| 3,196,696 | 7/1965 | Ritter | 74—15.88 X |
| 3,212,358 | 10/1965 | DeLalio | 74—687 |
| 3,180,095 | 4/1965 | Schneider. | |

ARTHUR T. McKEON, *Primary Examiner.*